(12) United States Patent
Mizutani et al.

(10) Patent No.: US 6,214,442 B1
(45) Date of Patent: Apr. 10, 2001

(54) RESIN MOLDED PRODUCT AND METHOD FOR PRODUCING THE SAME

(76) Inventors: Haruyasu Mizutani, 46-8, Hakusan, Sue, Saya-cho, Ama-gun, Aichi; Yasuaki Tanaka, 174, Nakayashiki, Nakamiyake, Heiwa-cho, Nakashima-gun, Aichi, both of (JP)

( * ) Notice: Subject to any disclaimer, the term of this patent is extended or adjusted under 35 U.S.C. 154(b) by 0 days.

(21) Appl. No.: 09/352,127

(22) Filed: Jul. 13, 1999

(30) Foreign Application Priority Data

Jul. 13, 1998 (JP) .................................................. 10-197431

(51) Int. Cl.⁷ .............................. B32B 3/00; B29B 7/00; B29C 45/00
(52) U.S. Cl. ............................ 428/156; 428/43; 428/213; 264/328.1; 264/328.12; 280/728.3
(58) Field of Search ............................. 428/43, 156, 167, 428/213; 264/167, 293, 297.2, 328.1, 328.12; 280/728.3

(56) References Cited

U.S. PATENT DOCUMENTS

| 5,641,554 | 6/1997 | Koizumi et al. ..................... 428/131 |
| 5,866,224 | * 2/1999 | Ang et al. ............................. 428/34 |

FOREIGN PATENT DOCUMENTS

| 10-259281 | 9/1998 | (JP) . |
| 10-264755 | 10/1998 | (JP) . |

* cited by examiner

*Primary Examiner*—Donald Loney (57) ABSTRACT

A resin molded product made of a thermoplastic resin composition and having a thick-walled portion, a thin-walled portion, and a wall-thickness changed portion provided between the thick-walled portion and the thin-walled portion. The thermoplastic resin composition exhibits a melting viscosity of not larger than 1500 poise and a die swell ratio of not lower than 1.0 when measured by using a capillary rheometer (temperature of 200° C. and die L/D=10 mm/1 mm) at a shear rate of not lower than 1200/sec.

10 Claims, 7 Drawing Sheets

RESIN MOLDED PRODUCT AND METHOD FOR PRODUCING THE SAME

BACKGROUND OF THE INVENTION

1. Field of the Invention

The present invention relates to a resin molded product and a method for producing the same. Particularly, it relates to a method of preventing external appearance failure such as uneven luster, or the like, from occurring in wall-thickness changed portions of an injection-molded product.

The present application is based on Japanese Patent Application No. Hei. 10-197431, which is incorporated herein by reference.

2. Description of the Related Art

Injection molding is a typical molding method with resin material. In the injection molding, molten resin is injected into a cavity through a gate of a die so that the cavity is filled with the resin. After the resin is cooled, die release is effected to take out the resin molded product.

Figure 7A:
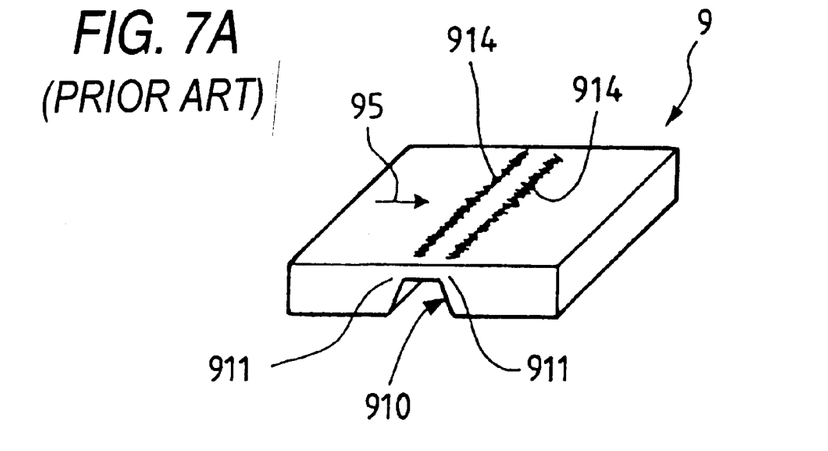
FIGS. 7A and 7B are perspective views of resin molded products showing a problem in the background art.
Figure 7B:
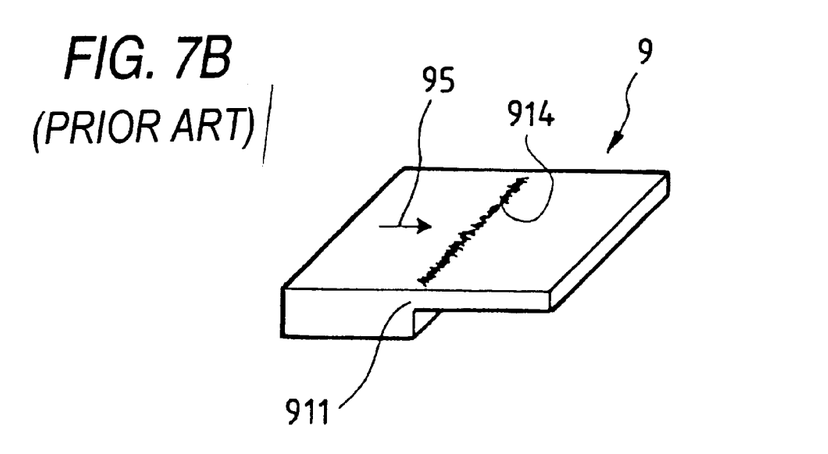

In the background-art injection molding method, however, uneven luster and sinking may occur in surfaces of wall-thickness changed portions 911 in a case where a resin molded product 9 having a wall changed in thickness as shown in FIG. 7A is formed. That is, when a groove 910 extending in the direction crossing the resin flow direction 95 is provided in the resin molded product 9, uneven luster stripes 914 occur in the surfaces of the wall-thickness changed portions 911 on opposite sides of the groove 910. Also in a case where a step-like wall-thickness changed portion 911 is provided in the resin molded product 9 as shown in FIG. 7B, an uneven luster stripe 914 occurs in a surface of the wall-thickness changed portion 911.

SUMMARY OF THE INVENTION

In consideration of the background-art problem, it is an object of the present invention to provide a resin molded product in which uneven luster and sinking is prevented from occurring in a wall-thickness changed portion to provide good external appearance, and a method for producing such a resin molded product.

According to the present invention, provided is a resin molded product made of a thermoplastic resin composition and having at least one thick-walled portion, at least one thin-walled portion, and at least one wall-thickness changed portion provided between the thick-walled portion and the thin-walled portion. The thermoplastic resin composition exhibits a melting viscosity of not larger than 1500 poise and a die swell ratio of not lower than 1.0 when measured by using a capillary rheometer (temperature of 200° C. and die L/D=10 mm/1 mm) at a shear rate of not lower than 1200/sec.

The present invention uses a thermoplastic resin composition having a predetermined melting viscosity and a predetermined die swell ratio to thereby prevent uneven luster and sinking from occurring in a wall-thickness changed portion of an injection-molded product.

It is estimated that uneven luster is caused in a wall-thickness changed portion by grain displacement in a flow path-reducing portion due to residual stress of molten resin in the flow path reducing portion at the die-releasing time or by shortage of transfer due to generation of negative pressure in a flow path enlarging portion, in the case where the thermoplastic resin composition is injected in the direction crossing the wall-thickness portions.

Figure 1:
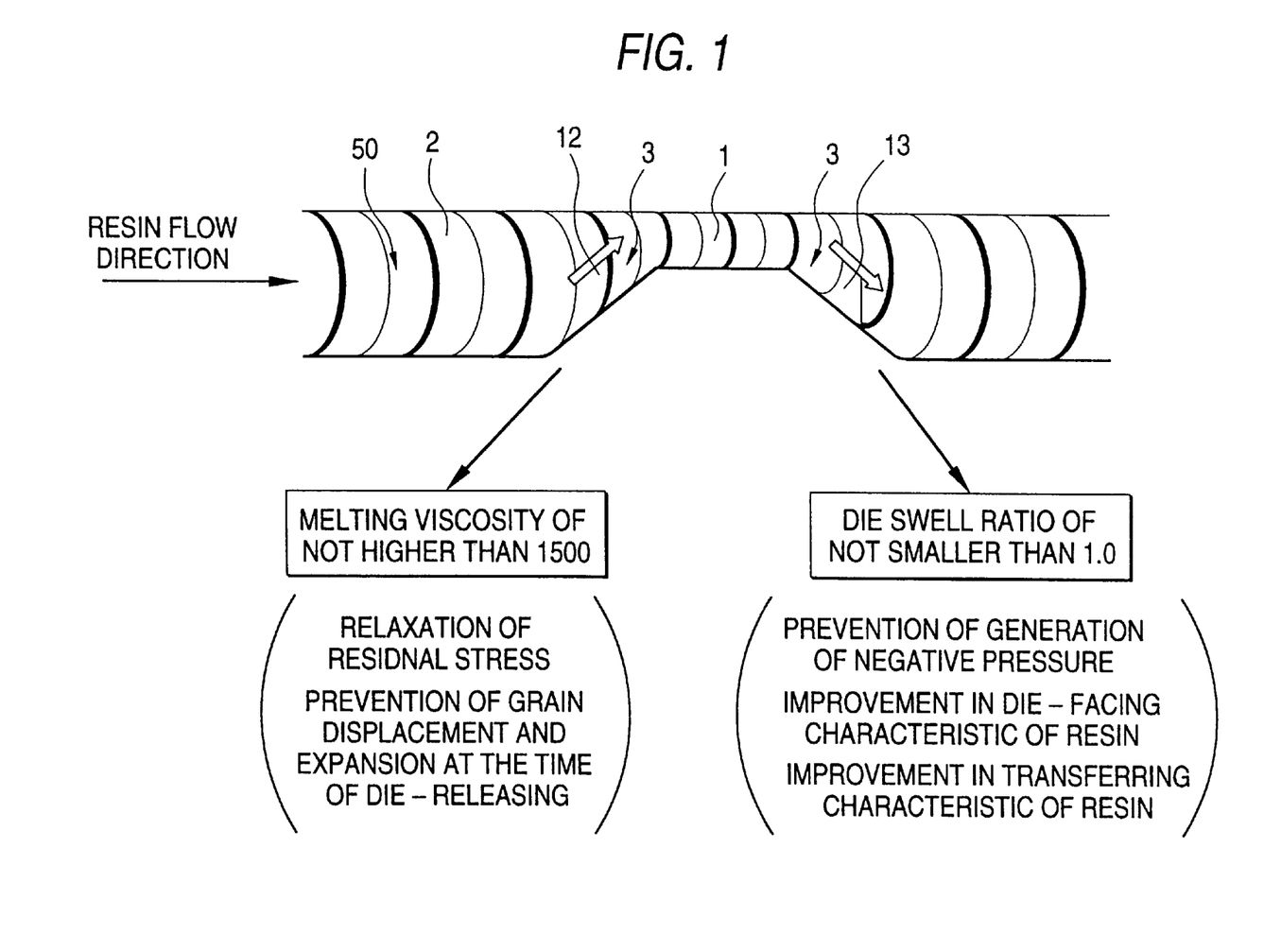
FIG. 1 is an explanatory view showing resin flow characteristic of a wall-thickness changed portion for explaining the operation of the present invention.

In the present invention, therefore, the melting viscosity of a thermoplastic resin composition 50 is set to be not higher than 1500 poise as shown in FIG. 1. As a result, uneven luster in the wall-thickness changed portions 3 can be prevented. That is, residual stress in the flow path reducing portion 12 just after injection is relaxed to thereby prevent both the grain displacement and the swelling of the flow path reducing portion 12 from occurring at the time of die-releasing. Accordingly, the occurrence of uneven luster in the flow path reducing portion 12 can be prevented.

Further, the die swell ratio of the thermoplastic resin composition 50 is set to be not smaller than 1.0. As a result, negative pressure in the flow path enlarging portion 13 at the time of injection is suppressed so that both the die-facing characteristic and the die-transferring characteristic for resin can be improved. Accordingly, the occurrence of uneven luster and sinking in the flow path enlarging portion 13 can be suppressed.

Incidentally, the die swell ratio is preferably set to be not smaller than 1.2.

Because the resin molded product according to the present invention is formed from the thermoplastic resin composition having the aforementioned physical property values, no uneven luster and sinking are produced in either case whether the resin molded product has an embossed (delustered) surface or a mirror surface. Accordingly, the resin molded product according to the present invention is excellent in external appearance characteristic.

The present invention will be described below in detail.

The resin molded product according to the present invention has a thick-walled portion, a thin-walled portion and a wall-thickness changed portion provided between the thick-walled portion and the thin-walled portion. Specific examples of the shape of the resin molded product are shown in FIGS. 2A to 2E.

Figure 2A:
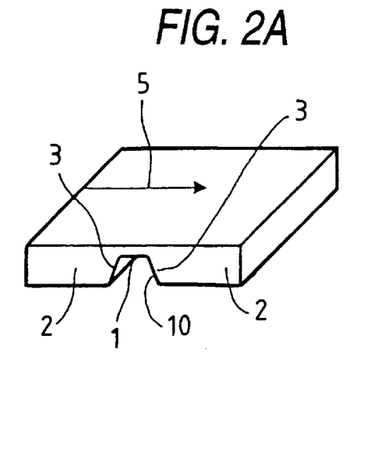
FIGS. 2A to 2E are perspective views of various types of resin molded products in the present invention.

As shown in FIG. 2A, a thin-walled portion 1 forms the bottom portion of a groove 10 formed between thick-walled portions 2 and 2 and in the direction crossing a resin flow direction 5, and wall-thickness changed portions 3 are formed on the opposite sides of the thin-walled portion 1.

Figure 2B:
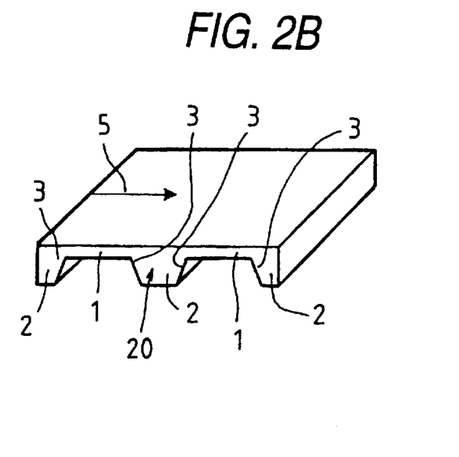

As shown in FIG. 2B, a thick-walled portion 2 constitutes a rib 20 formed between thin-walled portions 1, and wall-thickness changed portions 3 are formed on the opposite sides of each of the thin-walled portions 1 so as to extend in the direction crossing the resin flow direction 5.

Figure 2C:
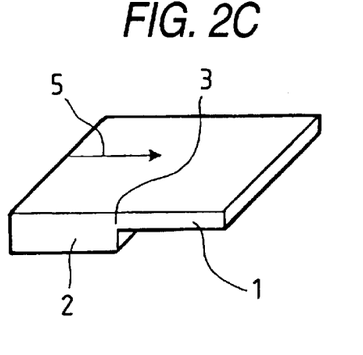

As shown in FIG. 2C, a thick-walled portion 2 and a thin-walled portion 1 are formed on the upstream and downstream sides, respectively, of the resin flow direction 5 in an injection die, and a step-like wall-thickness changed portion 3 is formed between the thick-walled portion 2 and the thin-walled portion 1.

Figure 2D:
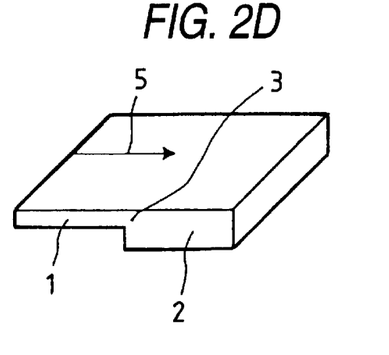

As shown in FIG. 2D, a thin-walled portion 1 and a thick-walled portion 2 are formed on the upstream and downstream sides, respectively, of the resin flow direction 5 in an injection die, and a step-like wall-thickness changed portion 3 is formed between the thick-walled portion 2 and the thin-walled portion 1.

Figure 2E:
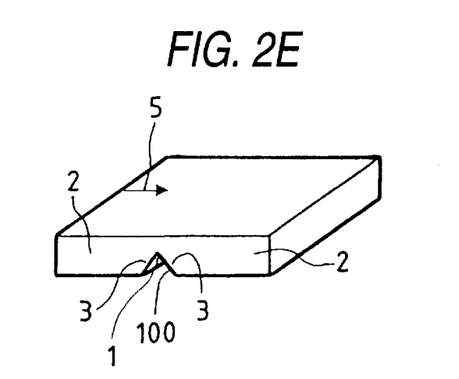

As shown in FIG. 2E, a thin-walled portion 1 constitutes the bottom portion of a triangular groove 100 formed between thick-walled portions 2 and 2 so as to extend in the direction crossing the resin flow direction 5, and wall-thickness changed portions 3 are formed on the opposite sides of the thin-walled portion 1.

Incidentally, the wall-thickness changed portion means a portion in which the wall thickness changes gradually from a thick state to a thin state or a portion in which the wall thickness changes like a perpendicular step between a thick-walled portion and a thin-walled portion.

The melting viscosity and the die swell ratio of the thermoplastic resin composition used in the resin molded product are measured by using a capillary rheometer. The melting viscosity used herein is defined as apparent viscosity (JIS K 7199).

The aforementioned physical property values of the thermoplastic resin composition are measured by using the capillary rheometer under the following conditions. The die has a length (L) of 10 mm and a diameter (D) of 1 mm. Further, the temperature of the thermoplastic resin composition at the time of the measurement is 200° C. The shear rate is not lower than 243–6080/sec.

When the melting viscosity of the thermoplastic resin composition used in the resin molded product according to the present invention is measured by using the capillary rheometer under the aforementioned measurement conditions, the melting viscosity is low so as to be not higher than 1500 poise at the shear rate of 1200/sec. Accordingly, residual stress in the flow path reducing portion can be relaxed so that swelling of the molded product at the time of die-releasing can be prevented and occurrence of uneven luster can be suppressed, as described above. On the contrary, if the melting viscosity is higher than 1500 poise, there is a problem that the residual stress is generated in the flow path reducing portion so that the flow path reducing portion swells at the time of die-releasing and uneven luster may occur.

Further, if the die swell ratio of the thermoplastic resin composition used in the resin molded product according to the present invention is measured by using the capillary rheometer under the aforementioned measurement conditions, it is found that the die swell ratio is large so as to be not lower than 1.0 at a shear rate of 1200/sec. Accordingly, negative pressure in the flow path enlarging portion at the time of injection can be suppressed so that transferring characteristic of resin can be improved and occurrence of uneven luster and sinking in the flow path enlarging portion can be suppressed, as described above. On the contrary, if the die swell ratio is smaller than 1.0, there is a problem that negative pressure is generated in the flow path enlarging portion at the time of injection so that the transferring characteristic of resin is worsened and uneven luster and sinking may occur in the flow path enlarging portion.

It is preferable that the percentage of change of the die swell ratio is not higher than 15% when the shear rate changes within a range of from 600 to 6000/sec. Thus, generation of negative pressure in the flow path enlarging portion can be prevented more securely, so that occurrence of uneven luster and sinking can be prevented more securely.

On the contrary, if the percentage of change of the die swell ratio is larger than 15% when the aforementioned shear rate changes within a range of from 600 to 6000/sec, negative pressure may be generated in the flow path enlarging portion and there is a fear that uneven luster and sinking occur.

The percentage (DSV) of change of the die swell ratio is a value calculated by the following expression (1):

$$DSV(\%) = 100 \times \{(DS{<}6000/sec{>}) - (DS'{<}600/sec{>})\} / (DS'{<}600/sec{>}) \quad \text{Expression (1)}$$

in which DS is the die swell ratio at a shear rate of 6000/sec, and DS' is the die swell ratio at a shear rate of 600/sec.

Further, it is preferable that the thermoplastic resin composition exhibits crystallization energy of not larger than 35 mJ/mg. As a result, the speed of solidification of the thermoplastic resin composition becomes low, so that the transferring characteristic of the thermoplastic resin composition in the flow path enlarging portion in the cavity is enhanced. Thus, the occurrence of uneven luster in the flow path enlarging portion can be suppressed more securely.

On the contrary, if the crystallization energy of the thermoplastic resin composition is larger than 35 mJ/mg, there is a fear that the speed of solidification becomes so high that the transferring characteristic in the flow path enlarging portion becomes poor and uneven luster occurs.

Incidentally, the crystallization energy is measured by using a differential thermometer.

Uneven luster is apt to occur as the difference between the thickness of a thick-walled portion and the thickness of a thin-walled portion in the resin molded product increases. In the present invention, the occurrence of uneven luster in a wall-thickness changed portion can be suppressed effectively even in the case where the resin molded product has the aforementioned shape.

Specifically, it is preferable that the percentage of wall-thickness change of the thickness S of the thin-walled portion to the thickness T of the thick-walled portion is in a range of from 20 to 99%. Thus, the aforementioned characteristic of the present invention can be fulfilled effectively.

On the contrary, if the percentage of change of thickness is smaller than 20%, there is no necessity of using the aforementioned predetermined thermoplastic resin composition for molding because the difference between the thickness of the thick-walled portion and the thickness of the thin-walled portion is so small that uneven luster hardly occurs originally. If the percentage is larger than 99%, there is a fear of shortage of strength because the thickness S of the thin-walled portion becomes small.

Further, it is preferable that the thickness change percentage of the thickness S of the thin-walled portion to the thickness T of the thick-walled portion is in a range of from 50% to 99%. Accordingly, the aforementioned characteristic of the present invention can be fulfilled most effectively.

The thickness change percentage DV of the thickness S of the thin-walled portion to the thickness T of the thick-walled portion is given by the following expression (2).

$$DV = 100 \times (T-S)/T \quad \text{Expression (2)}$$

As thermoplastic resin in the thermoplastic resin composition, there can be used one kind of material or a combination of two or more kinds of materials selected from the group, consisting of, for example, thermoplastic olefin resin, thermoplastic styrene resin, thermoplastic urethane resin, thermoplastic polyester resin, vinyl chloride resin, polyamide resin and fluororesin. However, the thermoplastic resin is not limited thereto. Examples of rubber components include ethylene-α-olefin copolymers such as EPR, EPDM, etc., and propylene-α-olefin copolymers such as PBR, etc. Examples of thermoplastic elastomer include styrene thermoplastic elastomers (such as SEBS, SBS, etc.) and olefin thermoplastic elastomers.

The resin molded product according to the present invention is applied to car parts such as a car air bag cover, an instrument panel, a bumper, a door pillar, a weather strip, a door trim, a shift lever boot, a column cover, a console box, a side mold, a bumper mold, a wheel cap, a locker mold, an engine cover, a timing belt cover, etc.

Of these, particularly, the air bag cover is attached to a conspicuous portion, so that the external appearance of the air bag cover is regarded as important. Accordingly, application of the present invention to the air bag cover makes great significance.

The resin molded product according to the present invention can be applied also to others such as an air conditioner cover, a personal computer casing, a portable telephone, a word processor, a facsimile equipment, a video deck, a television set, a radio set, an audio amplifier, a speaker box, a refrigerator, a washing machine, a cleaner, a rice cooker, etc.

In manufacturing such a resin molded product as mentioned above, for example, there is a method for forming a resin molded product of a thermoplastic resin composition having at least one thick-walled portion, at least one thin-walled portion, and at least one wall-thickness changed portion provided between the thick-walled portion and the thin-walled portion by injecting the thermoplastic resin composition into a die cavity in a direction crossing the wall-thickness changed portion. The thermoplastic resin composition exhibits a melting viscosity of not larger than 1500 poise and a die swell ratio of not lower than 1.0 when measured by using a capillary rheometer (temperature of 200° C. and die L/D=10 mm/1 mm) at a shear rate of not lower than 1200/sec.

In the producing method according to the present invention, injection molding is performed by use of the thermoplastic resin composition having the aforementioned physical property values. Accordingly, occurrence of uneven luster of resin in the flow path reducing portion and the flow path enlarging portion can be suppressed in the aforementioned manner, so that the resin molded product excellent in external appearance can be formed.

Also in the aforementioned producing method, like the invention concerning the aforementioned resin molded product, it is preferable that the thermoplastic resin composition has the aforementioned predetermined percentage of change of the die swell ratio and predetermined crystallization energy, and that the thickness change percentage of the thickness S of the thin-walled portion to the thickness T of the thick-walled portion is in a range of from 20% to 99%.

Further, with respect to the shape of the resin molded product to be formed, various shapes described above may be used. For example, the thin-walled portion may be shaped like a groove and the thick-walled portion may be shaped like a rib or a step.

Other points in the producing method according to the present invention are the same as those in the resin molded product.

Features and advantages of the invention will be evident from the following detailed description of the preferred embodiments described in conjunction with the attached drawings.

DETAILED DESCRIPTION OF THE PREFERRED EMBODIMENTS

Embodiment 1

Resin molded products according to an embodiment of the present invention will be described below on the basis of Examples 1 to 5 in comparison with Comparative Examples 1 and 2.

Production of Resin Molded Product

First, resin molded products according to Examples 1 to 5 and Comparative Examples 1 and 2 are formed.

Resin and rubber components of thermoplastic resin compositions used in the resin molded products are as follows.

(1) PP-1: propylene-ethylene block copolymer, melt flow rate (hereinafter referred to as MFR) of 33 g/10 min, ethylene content of 7% by weight;
(2) PP-2: propylene-ethylene block copolymer, MFR of 7 g/10 min, ethylene content of 12% by weight;
(3) PP-3: propylene-ethylene random copolymer, MFR of 30 g/10 min;
(4) PP-4: propylene-ethylene block copolymer, MFR of 65 g/10 min;
(5) EPR-1: ethylene-propylene rubber, MFR of 40 g/10 min;
(6) EPR-2: ethylene-propylene rubber, MFR of 1 g/10 min;
(7) EPR-3: ethylene-propylene rubber, MFR of 8 g/10 min;
(8) SEBS: styrene-ethylene-butylene-styrene copolymer, styrene content of 29% by weight, MFR of 1.3 g/10 min;
(9) PB: polybutene, MFR of 20 g/10 min (190° C.);
(10) PBR: propylene-butene rubber, MFR of 6 g/10 min;
(11) LDPE: low density polyethylene, MFR of 6 g/10 min;
(12) EBM-1: ethylene-butene rubber, MFR of 3.6 g/10 min (190° C.);
(13) EBM-2: ethylene-butene rubber, MFR of 0.5 g/10 min (190° C.).

Then, the thermoplastic resin compositions (1) to (13) were mixed suitably as shown in Table 1, so that a kneaded material was obtained.

Figure 3:
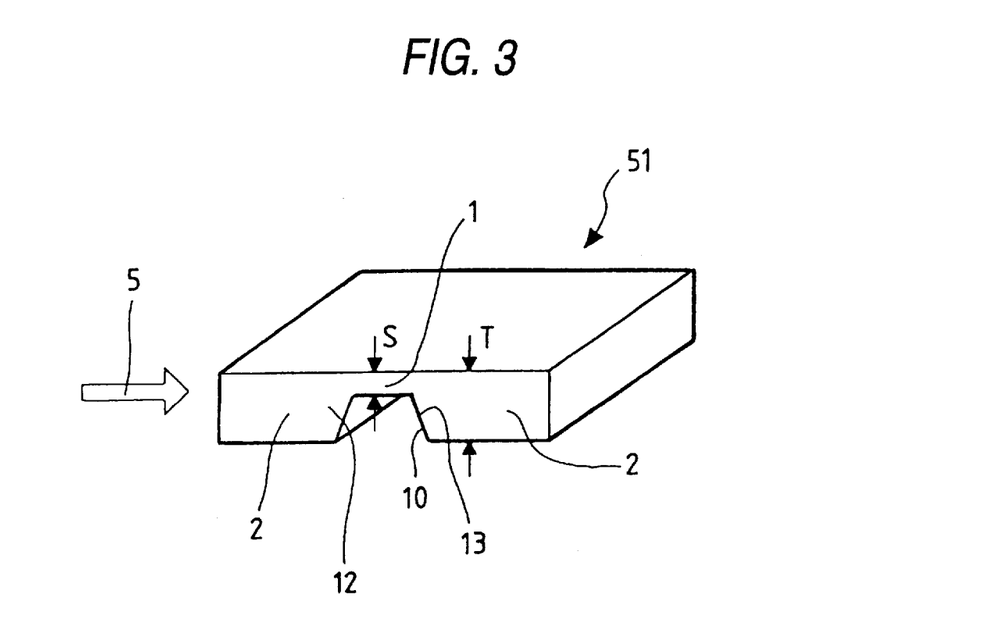
FIG. 3 is a perspective view of a resin molded product in Embodiment 1.

The kneaded material obtained thus was then injected into an injection-molding die cavity. The shape of the die cavity was set so that a plate-like resin molded product 51 having a groove 10 as shown in FIG. 3 was obtained. The injection condition was set so that the molten resin temperature, injection speed and injection pressure were 200° C., 150 cm$^3$/sec and 50 kgf/cm$^2$ respectively.

After injection molding, cooling and die-releasing were performed to thereby take out the resin molded product 51.

TABLE 1

|  | Example 1 | Example 2 | Example 3 | Example 4 | Example 5 | Comparative Example 1 | Comparative Example 2 |
|---|---|---|---|---|---|---|---|
| PP-1 | 40 | 50 | 35 |  |  | 50 |  |
| PP-2 |  |  |  |  |  |  | 70 |
| PP-3 |  |  |  | 35 |  |  |  |
| PP-4 |  |  |  |  | 40 |  |  |
| EPR-1 | 5 | 10 |  |  |  |  |  |
| EPR-2 |  |  |  |  |  | 30 |  |
| EPR-3 | 35 | 40 | 35 |  |  |  |  |
| SEBS |  |  |  |  |  | 20 | 30 |
| PB |  |  | 30 |  |  |  |  |
| LDPE |  |  |  | 5 | 5 |  |  |
| EBM-1 |  |  |  | 50 |  |  |  |
| EBM-2 |  |  |  |  | 45 |  |  |
| PBR | 20 |  |  | 10 | 10 |  |  |
| Melting Viscosity (poise)* | 1155 | 907 | 777 | 1287 | 1406 | 1829 | 1700 |
| Die Swell Ratio* | 1.75 | 1.83 | 1.66 | 1.42 | 1.30 | 1.28 | 1.18 |
| Die Swell Ratio Change Rate (%)* | 8.7 | 5.4 | 9.8 | 1.4 | 13.5 | 18.9 | 12.1 |
| Crystallization Energy (mJ/mg) | 25 | 27 | 32 | 26 | 34 | 40 | 45 |
| Thickness Change Percentage (%) | 68 | 68 | 77 | 68 | 68 | 68 | 68 |
| Uneven Luster (Flow Path Reducing Portion) | ○ | ○ | ○ | ○ | ○ | x | x |
| Uneven Luster (Flow path Enlarging Portion) | ○ | ○ | ○ | ○ | ○ | Δ | x |

*These were measured by using a capillary rheometer.

Thickness Change Percentage

As shown in FIG. 3, the thickness T of a thick-walled portion 2 and the thickness S of a thin-walled portion 1 in the resin molded product 51 were measured. From these measured values, the percentage of change of thickness was obtained by the aforementioned expression (2).

Evaluation of External Appearance of Resin Molded Product

The external appearance of the resin molded product thus obtained was evaluated by eye observation. Places to be observed were a flow path reducing portion 12 and a flow path enlarging portion 13 as shown in FIG. 3. The symbol "○" is marked in the case where uneven luster was substantially inconspicuous. The symbol "Δ" is marked in the case where uneven luster was recognized.

The symbol "x" is marked in the case where uneven luster was very conspicuous.

Melting Viscosity, Die Swell Ratio and Die Swell Ratio Change Percentage of Thermoplastic Resin Composition used in Resin Molded Product The melting viscosity and the die swell ratio of each of the kneaded materials used in Examples 1 to 5 and Comparative Examples 1 and 2 were measured by using a capillary rheometer.

Figure 4A:
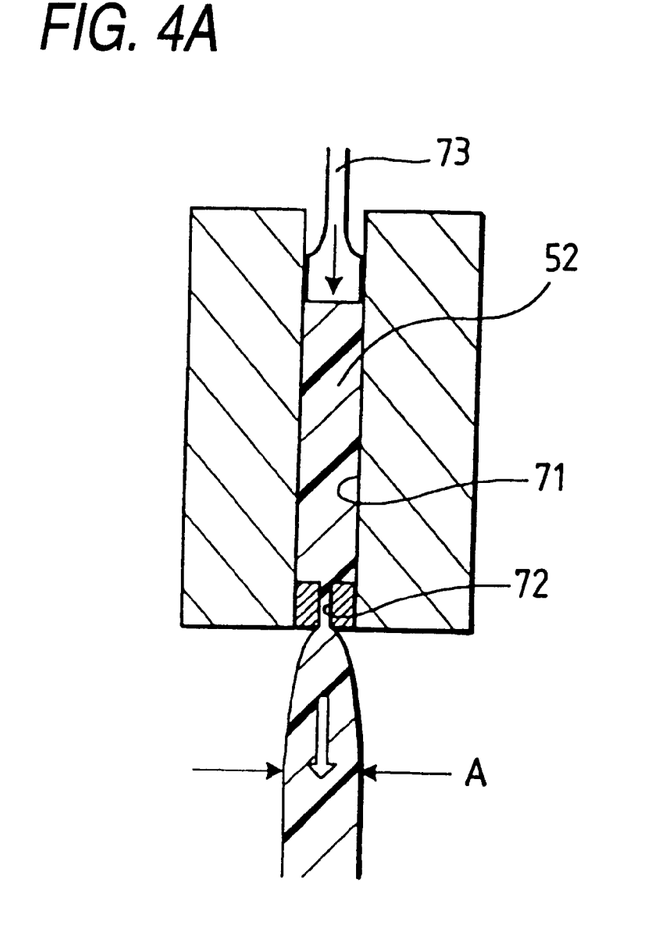
FIGS. 4A and 4B are an explanatory views showing a method for measuring the melting viscosity, the die swell ratio and the die swell ratio change percentage of a thermoplastic resin composition used in the resin molded product in Embodiment 1.

A method for measuring the melting viscosity and the die swell ratio of resin with a capillary rheometer will be described below. As shown in FIG. 4, the capillary rheometer comprises a barrel 71 provided to be filled with resin, a capillary 72 through which molten resin passes, and a piston 73 for pressing the resin.

A kneaded material 52 of thermoplastic resin compositions to be measured was heated at 200° C. so as to be melted. The barrel 71 was filled with the kneaded material 52. The kneaded material 52 was pressed by the piston 73 at a shear rate of 1216/sec so as to be extruded from the capillary 72.

Figure 4B:
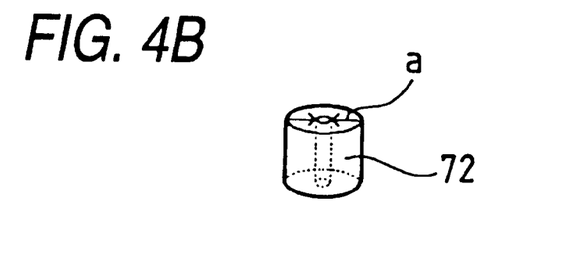

The spread width A of the kneaded material in this occasion was measured by using laser, or the like. The spread width A was divided by the aperture size a (FIG. 4B) of the capillary 72. The quotient (A/a) was provided as the die swell ratio.

In this embodiment, CAPILOGRAPH-1B (trade name) made by Toyoseiki Seisakusho, Ltd., was used as the capillary rheometer.

The barrel diameter, the die length (L) and the die diameter (D) were set to be 9.55 mm, 10 mm and 1 mm, respectively. The melt temperature of resin at the time of measurement was set to be 200° C. and the shear rate was changed to 20, 50,100, 200 and 500 mm/min.

Further, the die swell ratio was measured in the two cases where the shear rate of the kneaded material was set to be 6000/sec and 600/sec. From these measured values, the die swell ratio change percentage was obtained by the aforementioned expression (2).

Further, from the pressing force of the piston 73 to the kneaded material, the melting viscosity (apparent viscosity) was obtained by a known method (JIS K 7199).

Crystallization Energy of Thermoplastic Resin Composition used in Resin Molded Product Further, the crystallization energy of each of the kneaded materials was measured. A measurement method was as follows. Each of the kneaded materials was heated to 220° C. so as to be melted. The kneaded material was then cooled from 220° C. to 50° C. at a cooling rate of 10° C./min. The amount of heat required for solidifying molten resin in this occasion was measured by using a differential thermometer (SSC5000 or DSC22C (trade name) made by Seiko Electronics Co., Ltd.).

These measurement results were shown in Table 1.

From these results, the resin molded products in Examples 1 to 5 according to the present invention were free from uneven luster. On the other hand, uneven luster was observed in Comparative Examples 1 and 2.

In each of the kneaded materials in Examples 1 to 5, the melting viscosity was not larger than 1500 poise, the die swell ratio was not smaller than 1.00, the die swell ratio change percentage was not larger than 15%, and the crystallization energy was not larger than 35 mJ/mg. On the other hand, in the kneaded materials in Comparative Examples 1 and 2, some physical property values depart from those mentioned above.

It is apparent from the measurement results that occurrence of uneven luster and sinking in a wall-thickness changed portion of the resin molded product according to the present invention can be suppressed because the resin molded product has the aforementioned physical property values.

Embodiment 2

In this embodiment, a kneaded material of a thermoplastic resin composition in Example 1 was used for molding an air bag cover for a car. A surface of the air bag cover was provided as a delustered surface (mate surface).

Figure 5:
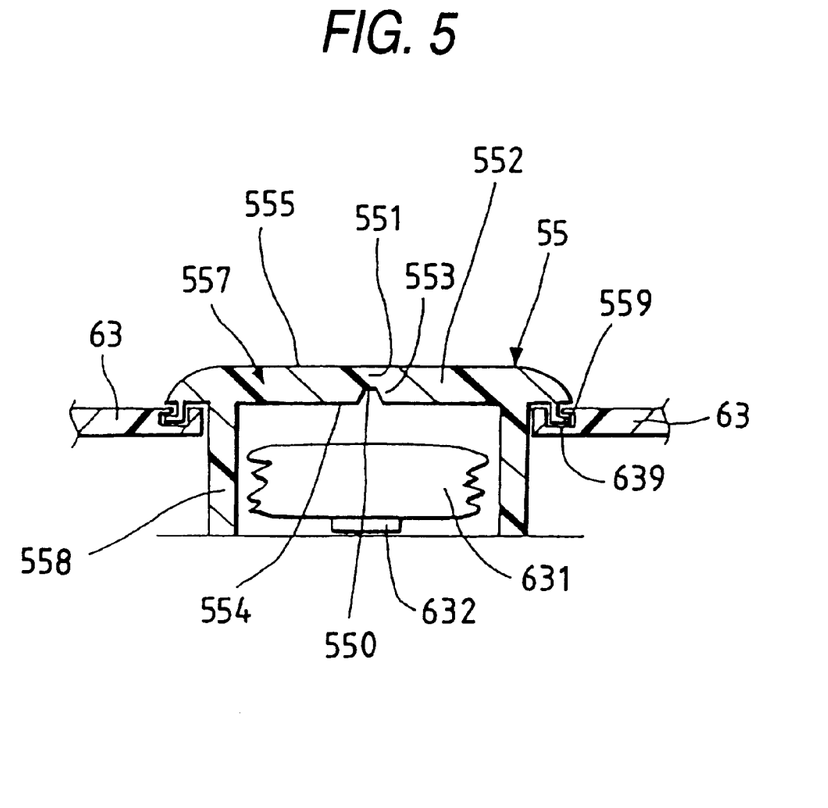
FIG. 5 is a plan view of the inside of a car showing an air bag cover mounting position in Embodiment 2.

As shown in FIG. 5, the air bag cover 55 to be molded comprises a flat portion 557, and leg portions 558 extended from the circumference of the flat portion 557. The flat portion 557 includes thick-walled portions 552, and a thin-walled portion 551 which forms the bottom portion of an air bag cleavage groove 550. Wall-thickness changed portions 553 are provided on the opposite sides of the thin-walled portion 551.

Figure 6A:
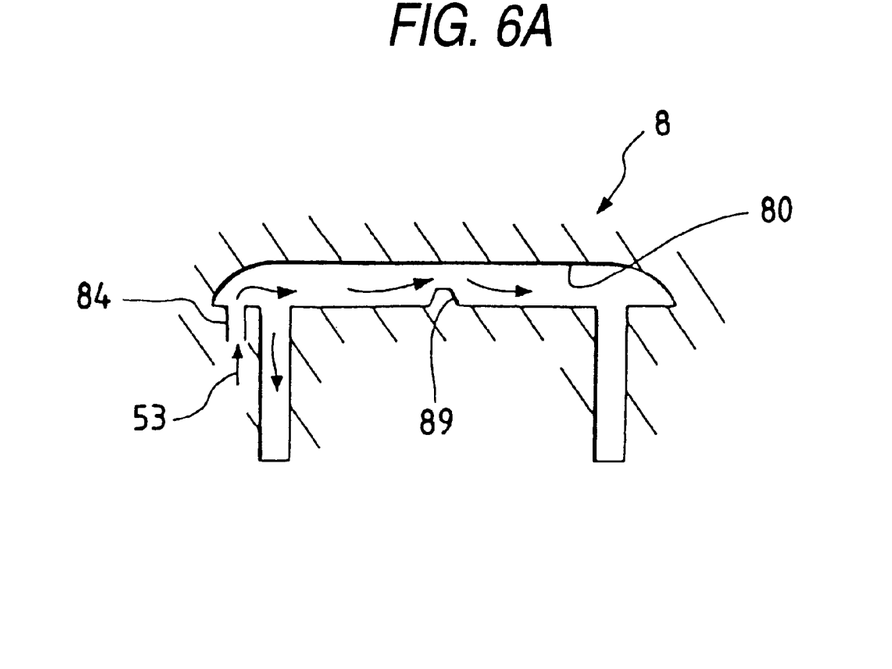
FIG. 6A is an sectional explanatory view of a mold showing a method for molding an air bag cover in Embodiment 2.

For molding the air bag cover, an injection-molding die 8 provided with a cavity 80 having the same shape as that of the air bag cover is prepared as shown in FIG. 6A. A protrusion 89 for forming a groove in the back surface of the air bag cover is provided in the cavity 80. The molten thermoplastic resin composition 53 is injected into the cavity 80 through a gate 84, so that the cavity 80 is filled with the thermoplastic resin composition 53. The thermoplastic resin composition 53 is then hardened. The thermoplastic resin composition used herein is the same as that in Example 1 of Embodiment 1. Thus, the air bag cover 55 is obtained.

Figure 6B:
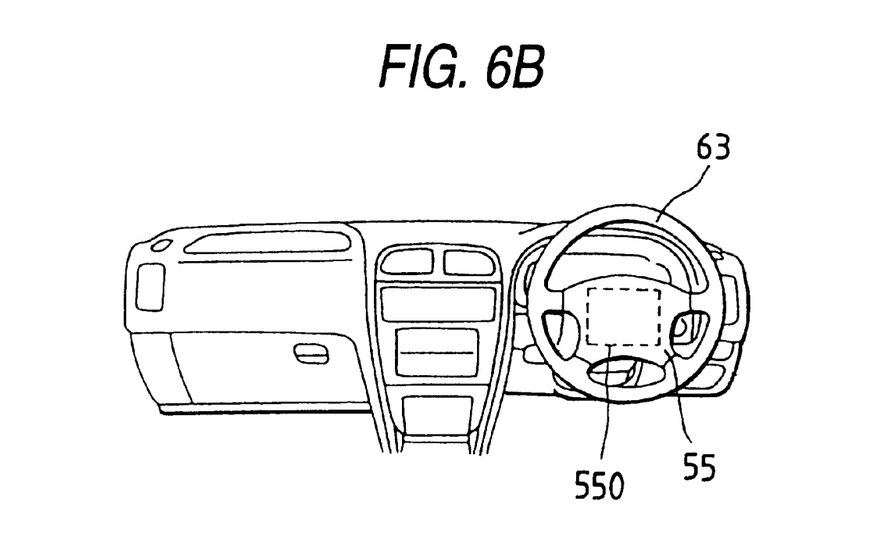
FIG. 6B is a plan view of the air bag cover attached to a steering wheel.

The air bag cover 55 obtained thus is attached to the center shaft of a steering wheel 63 for a car as shown in FIG. 6B.

As shown in FIG. 5, the air bag cover 55 is fixed to concave portions 639 of the steering wheel 63 by attachment stopper portions 559 provided in the circumferential edge of the air bag cover 55. An air bag 631 is received in the air bag cover 55.

The air bag 631 is supplied with a gas so as to be inflated by an inflator 632 at the time of car collision. The pressing force caused by the inflation of the air bag 631 cleaves the air bag cover 55 at the groove 550 provided in the back surface 554 of the air bag cover 55. As a result, the air bag 631 is made to dash out to the front of a crew member.

In the air bag cover obtained in this embodiment, neither uneven luster nor sinking was observed. Also in the surfaces 555 of the wall-thickness changed portions 553, neither uneven luster nor sinking was observed. The air bag cover was excellent in external appearance characteristic.

Embodiment 3

This embodiment was the same as Embodiment 2 except that a mirror-surface air bag cover was molded in this embodiment. Also in this embodiment, uneven luster was not observed in the air bag cover.

According to the present invention, it is possible to provide a resin molded product in which uneven luster and sinking are prevented from occurring in a wall-thickness changed portion so that the external appearance is good, it is possible to provide a method for producing such a resin molded product.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A resin molded product made of a thermoplastic resin composition and comprising a thick-walled portion, a thin-walled portion, and a wall-thickness changed portion provided between said thick-walled portion and said thin-walled portion, wherein said thermoplastic resin composition has a melting viscosity of not larger than 1500 poise and a die swell ratio of not lower than 1.0 when measured by using a capillary rheometer in a condition of a temperature of 200° C. and die L/D=10 mm/1 mm at a shear rate of not lower than 1200/sec.

2. A resin molded product according to claim 1, wherein a percentage of change of said die swell ratio is not higher than 15% when said shear rate changes within a range of from 600 to 6000/sec.

3. A resin molded product according to claim 1, wherein said thermoplastic resin composition has crystallization energy of not larger than 35 mJ/mg.

4. A resin molded product according to claim 1, wherein a percentage of wall-thickness change of a thickness of said thin-walled portion to a thickness of said thin-walled portion is in a range of from 20 to 99%.

5. A resin molded product according to claim 1, wherein said thin-walled portion forms a bottom portion of a groove formed between two of said thick-walled portions, and said wall-thickness changed portion is formed on each of opposite sides of said thin-walled portion.

6. A method for forming a resin molded product of a thermoplastic resin composition, comprising the steps of:

preparing a die cavity having a portion for forming a thick-walled portion, a thin-walled portion, and a wall-thickness changed portion therein; and injecting said thermoplastic resin composition into said die cavity in a direction crossing said portion form forming said wall-thickness changed portion, wherein said thermoplastic resin composition exhibits a melting viscosity of not larger than 1500 poise and a die swell ratio of not lower than 1.0 when measured by using a capillary rheometer in a condition of a temperature of 200° C. and die L/D=10 mm/1 mm at a shear rate of not lower than 1200/sec.

7. A method for forming a resin molded product according to claim 6, wherein a percentage of change of said die swell ratio is not higher than 15% when said shear rate changes within a range of from 600 to 6000/sec.

8. A method for forming a resin molded product according to claim 6, wherein said thermoplastic resin composition has crystallization energy of not larger than 35 mJ/mg.

9. A method for forming a resin molded product according to claim 6, wherein a percentage of wall-thickness change of a thickness of said thin-walled portion to a thickness of said thick-walled portion is in a range of from 20 to 99%.

10. A method for forming a resin molded product according to claim 6, wherein said thin-walled portion forms a bottom portion of a groove formed between two of said thick-walled portions, and said wall-thickness changed portion is formed on each of opposite sides of said thin-walled portion.

* * * * *

UNITED STATES PATENT AND TRADEMARK OFFICE
CERTIFICATE OF CORRECTION

PATENT NO. : 6,214,442 B1
DATED : April 10, 2001
INVENTOR(S) : Mizutani et al.

It is certified that error appears in the above-identified patent and that said Letters Patent is hereby corrected as shown below:

<u>Title page,</u>
Insert the following: [73] Assignee: TOYODA GOSEI CO., LTD. of Aichi-ken (JP)

Signed and Sealed this

Ninth Day of October, 2001

Attest:

*Nicholas P. Godici*

NICHOLAS P. GODICI
*Attesting Officer*    *Acting Director of the United States Patent and Trademark Office*